(12) United States Patent
Scensny et al.

(10) Patent No.: US 6,471,277 B1
(45) Date of Patent: Oct. 29, 2002

(54) CARGO BED STORAGE TRUNK FOR A VEHICLE

(75) Inventors: Brian Scott Scensny, Macomb Township; Joseph Porcari, Canton, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,120

(22) Filed: Jul. 24, 2001

(51) Int. Cl.[7] ................................................. B60R 9/06
(52) U.S. Cl. ...................................... 296/37.6; 296/183
(58) Field of Search ...................... 296/10, 37.6, 37.14, 296/183, 57.1

(56) References Cited

U.S. PATENT DOCUMENTS

| | | | | |
|---|---|---|---|---|
| 1,532,128 A | * | 4/1925 | Fletcher | 296/37.6 X |
| 2,955,863 A | * | 10/1960 | Olender | 296/57.1 X |
| 4,394,100 A | * | 7/1983 | Sperlich | 296/37.6 X |
| 5,288,124 A | | 2/1994 | Ward | |
| 5,897,154 A | | 4/1999 | Albertini | |
| 5,927,783 A | | 7/1999 | Baka | |
| 5,971,469 A | | 10/1999 | Lund et al. | |
| 6,092,852 A | | 7/2000 | Lawrence | |
| 6,155,625 A | * | 12/2000 | Felix | 296/37.14 |

* cited by examiner

*Primary Examiner*—Dennis H. Pedder
(74) *Attorney, Agent, or Firm*—Gigette Bejin

(57) ABSTRACT

A cargo bed storage trunk for a vehicle including a cargo bed having a back end, a tailgate pivotally attached to the back end operable between a closed vertical position and an opened position, and a panel situated inside the cargo bed operable between a closed horizontal position and an opened position.

12 Claims, 2 Drawing Sheets

CARGO BED STORAGE TRUNK FOR A VEHICLE

BACKGROUND OF INVENTION

The present invention relates to storage trunks for vehicles, and more specifically, to a cargo bed storage trunk for a vehicle.

Pickup trucks, certain sport utility vehicles, and the like typically have an open cargo bed area for transporting large loads. While designed for this purpose, sometimes an open cargo bed is undesirable. For example, if there is a load in the cargo area and the operator needs to be away from the vehicle for a time period, it is undesirable to have an open cargo bed for security reasons. It is also problematic to have an open cargo bed when transporting a load in inclement weather, where some sort of protection against strong winds, snow, and rain is desired.

To solve these problems, a number of separate devices are used. Caps are used to protect the load from the elements of the weather. Caps typically also have a locking mechanism for security. However, caps limit the cargo carrying capacity. Caps are also difficult to place on the vehicle and remove, and usually require two or more people to do so. Tonneau covers are similar to caps in that they protect the load from the weather and provide security through locking means, but they limit the cargo carrying capacity even more so than caps. Tonneau covers also usually require more than one person to place them on the vehicle and to remove them. Lock boxes are used for storage, typically for tools or work materials, and are secure. As they are generally the same depth as the cargo bed and do not extend a substantial amount in length, they typically do not limit the cargo carrying capacity. However, accessibility is limited, as in order to unlock, open, and retrieve the contents, one typically must be in the cargo bed.

It would therefore be beneficial to have a storage space in the cargo bed that is secure and protects the contents from the weather, while still allowing for accessibility and maximum open cargo carrying capacity.

SUMMARY OF INVENTION

It is an object of the present invention to provide a cargo bed storage trunk for a vehicle that overcomes the disadvantages of the prior art.

It is a feature of the present invention that the cargo bed storage trunk has a panel forming the floor of the cargo bed, which is situated just above the wheel wells and pivots where the bed meets the cab, thereby creating a storage area, or trunk, below the panel.

The present invention advantageously provides a cargo bed storage trunk for a vehicle including a cargo bed having a back end, a tailgate pivotally attached to the back end operable between a closed vertical position and an opened position, and a panel situated inside the cargo bed operable between a closed horizontal position and an opened position.

BRIEF DESCRIPTION OF DRAWINGS

These and other objects, features, and advantages of the present invention will become apparent from a reading of the following detailed description with reference to the accompanying drawings, in which.

DETAILED DESCRIPTION

Figure 1:
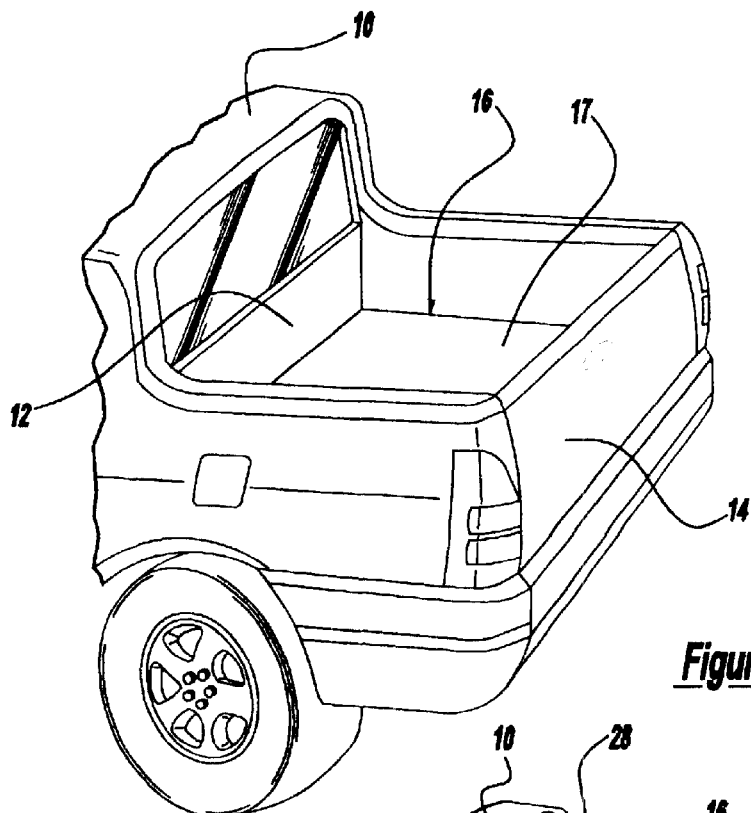
FIG. 1 is a perspective view of a vehicle having a cargo bed storage trunk in a closed position and a tailgate in a closed position according to the present invention.

In FIG. 1, a vehicle 10 having a cargo bed 12 and a tailgate 14 is shown. Also shown is a panel 17, which covers a cargo bed storage trunk 16. The panel 17 of the cargo bed storage trunk 16 forms the floor of the cargo bed 12 when in a closed position as shown. The tailgate 14 is operable between a closed vertical position as shown here, and an opened position 180 degrees from the vertical closed position so that it is perpendicular, in both open and closed positions, with respect to the closed panel 17 of the cargo bed storage trunk 16.

Figure 2:
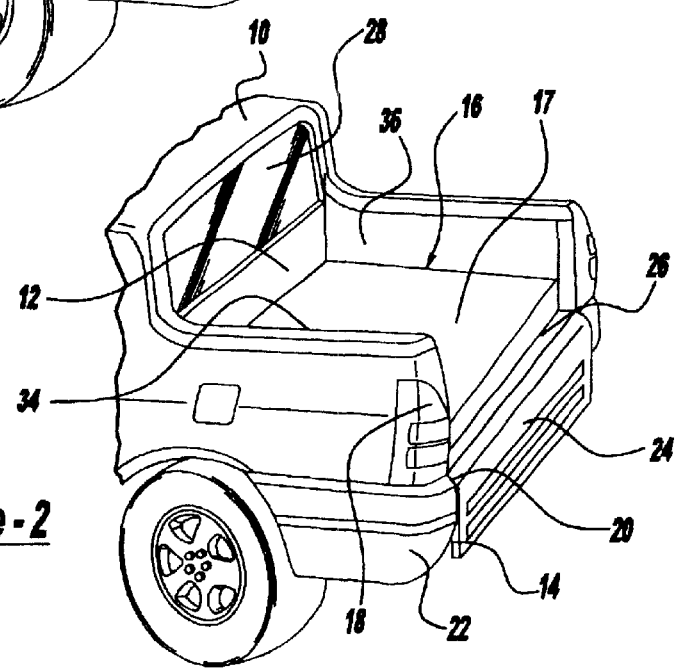
FIG. 2 is a perspective view of a vehicle having a cargo bed storage trunk in a closed position and a tailgate in an opened position according to the present invention.

In FIG. 2, the tailgate 14 is in an opened position and the panel 17 of the cargo bed storage trunk 16 is in a closed position. The vehicle 10 has a back end 18 in which there is a recess 20 to receive the tailgate 14 when in an opened position so that an inner surface 24 of the tailgate 14 is flush with the back end 18 of the vehicle 10. Alternatively, where there is no recess 20, the tailgate 14 may be pulled away from the vehicle 10 and then pivot down over a bumper 22. Also, the tailgate 14 could be split vertically down the center and hinged at the sides to rotate about a vertical axis when opened.

As also seen in FIG. 2, the panel 17 of the cargo bed storage trunk 16 is a predetermined thickness. The panel 17 of the cargo bed storage trunk 16 begins where a cab 28 meets the cargo bed 12 and extends the entire length of the cargo bed 12 so that when the panel 17 of the cargo bed storage trunk 16 is closed, it preferably meets with the inner surface 24 of the closed tailgate 14. The panel 17 of the cargo bed storage trunk 16 also preferably extends the entire width of the cargo bed 12 from a left side 34 to a right side 36. The panel may be shorter than the width and length of the cargo bed 12 depending on structural and drainage needs. As seen here, a storage area 26 is situated below the panel 17 of the cargo bed storage trunk 16 when in a closed position thereby serving as a trunk, and the panel 17 of the cargo bed storage trunk 16 serves as the floor of the cargo bed 12.

Figure 3:
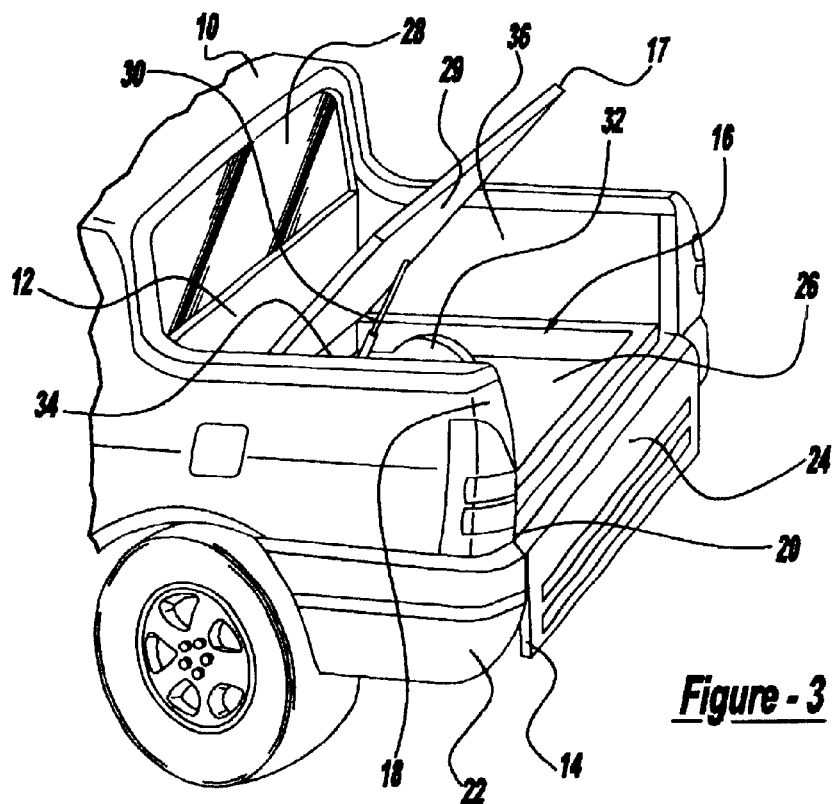
FIG. 3 is a perspective view of a vehicle having a cargo bed storage trunk in an opened position and a tailgate in an opened position according to the present invention.

FIG. 3 shows the panel 17 of the cargo bed storage trunk 16 in an opened position and the tailgate 14 in an opened position, showing the storage area 26. As seen here, the panel 17 of the cargo bed storage trunk 16 pivots where the cab 28 meets the cargo bed 12 a predetermined distance upward allowing access to the storage area 26. The panel 17 of the cargo bed storage trunk 16 has an underside 29 which has hardware 30 attached thereto that enables the panel 17 of the cargo bed storage trunk 16 to be pivoted and held in the opened and closed positions.

Figure 4:
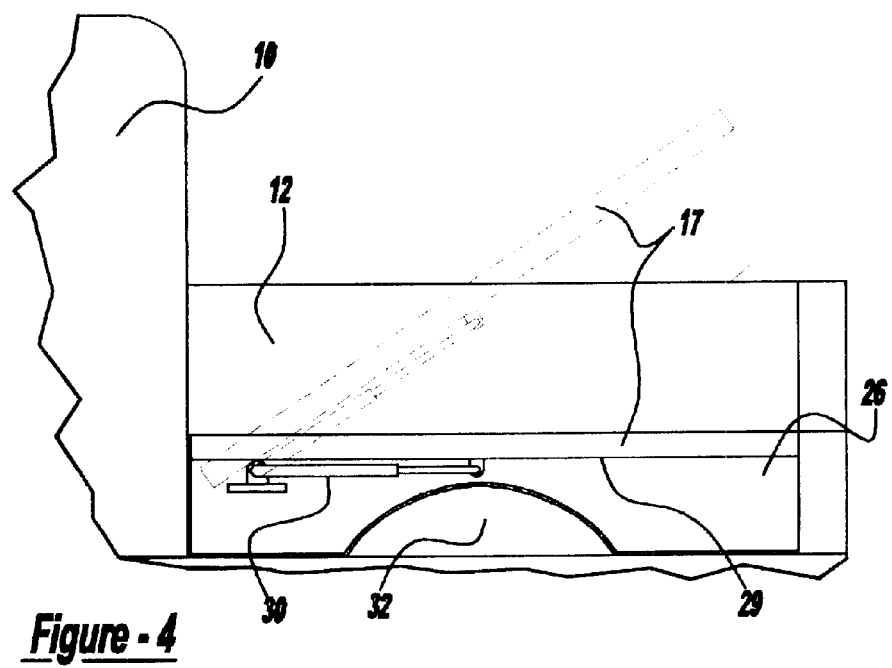
FIG. 4 is a side cut-away view of a cargo bed storage trunk operable between opened and closed positions according to the present invention.

A closer look at the storage area 26 can be seen in FIG. 4. Here, a wheel well 32 on the right side 36 of the vehicle 10 is shown. The panel 17 of the cargo bed storage trunk 16 is situated such that when in a closed position, the underside 29 rests just above the wheel wells 32, thereby forming the raised floor of the cargo bed 12 while providing an adequate storage area 26 underneath. This is advantageous when a wide flat area is needed for loading lumber, drywall or the like.

In using the cargo bed storage trunk 16, first the tailgate 14 is opened and rotated from the vertical upward closed position 180 degrees downward to the vertical open position. Then the panel 17 of the cargo bed storage trunk 16 is pivoted upward a predetermined degree to the opened position wherein cargo can then be loaded in the storage area 26. The panel 17 of the cargo bed storage trunk 16 is then closed as is the tailgate 14, thus providing security and adequate coverage for the load while still allowing largo carge to be placed on top of the panel 17 of the cargo bed storage trunk 16, which now serves as the floor of the cargo bed 12. This then allows for maximum open cargo carrying capacity.

While only one embodiment of the cargo bed storage trunk of the present invention has been described, others may be possible without departing from the scope of the following claims.

What is claimed is:

1. A cargo bed storage trunk for a vehicle comprising:

a cargo bed having sidewalls and a back end;

a tailgate pivotally attached to the back end operable between a closed vertical position and an opened position; and a panel situated inside the cargo bed below tops of the sidewalls and extending the entire length and width of the cargo bed operable between a closed horizontal position and an opened position.

2. The cargo bed storage trunk as defined in claim 1, wherein the panel forms the floor of the cargo bed when in the closed horizontal position.

3. The cargo bed storage trunk as defined in claim 1, wherein the tailgate is received in a recess when in the opened position thereby being flush with the vehicle.

4. The cargo bed storage trunk as defined in claim 1, wherein the tailgate is pivoted substantially 180 degrees from the closed vertical position to a vertical opened position.

5. The cargo bed storage trunk as defined in claim 1, wherein the panel is pivoted upward a predetermined degree when in the opened position.

6. The cargo bed storage trunk as defined in claim 1, further including a cab adjacent the cargo bed wherein the panel is pivotally operable where the cargo bed meets the cab.

7. The cargo bed storage trunk as defined in claim 1, further having wheel wells wherein the panel is situated above the wheel wells when in a closed position thereby forming a storage area thereunder. position wherein the panel reveals a storage area thereunder.

8. A cargo bed storage trunk for a vehicle comprising:

a cargo bed having sidewalls, a back end and wheel wells;

a tailgate pivotally attached to the back end operable between a closed vertical position and an opened position;

a cab adjacent to the cargo bed; and a panel situated inside the cargo bed above the wheel wells pivotally operable where the cargo bed meets the cab between a closed horizontal position wherein the panel serves as a floor of the cargo bed located below tops of the sidewalls and an opened position wherein the panel reveals a storage area thereunder.

9. The cargo bed storage trunk as defined in claim 8, wherein the tailgate is received in a recess when in an opened position thereby being flush with the vehicle.

10. The cargo bed storage trunk as defined in claim 8, wherein the tailgate is pivoted substantially 180 degrees from the closed vertical position to a vertical opened position.

11. The cargo bed storage trunk as defined in claim 8, wherein the panel is pivoted upward a predetermined degree when in the opened position.

12. The cargo bed storage trunk as defined in claim 8, wherein the panel extends the entire length and width of the cargo bed.

\* \* \* \* \*